US011233463B2

(12) United States Patent
Robinson

(10) Patent No.: US 11,233,463 B2
(45) Date of Patent: Jan. 25, 2022

(54) MODULAR MULTILEVEL CONVERTER

(71) Applicant: Siemens Aktiengesellschaft, Munich (DE)

(72) Inventor: Jonathan Robinson, Nuremberg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/965,296

(22) PCT Filed: Dec. 28, 2018

(86) PCT No.: PCT/EP2018/097093
§ 371 (c)(1),
(2) Date: Jul. 27, 2020

(87) PCT Pub. No.: WO2019/149438
PCT Pub. Date: Aug. 8, 2019

(65) Prior Publication Data
US 2021/0083596 A1    Mar. 18, 2021

(30) Foreign Application Priority Data

Jan. 31, 2018 (EP) .................... 18154369

(51) Int. Cl.
*H02M 7/483* (2007.01)
*H02M 1/00* (2006.01)
*H02M 7/5387* (2007.01)

(52) U.S. Cl.
CPC ............ *H02M 7/483* (2013.01); *H02M 1/00* (2013.01); *H02M 7/53871* (2013.01); *H02M 1/0054* (2021.05); *H02M 7/4835* (2021.05)

(58) Field of Classification Search
CPC ...... H02M 1/00; H02M 1/0054; H02M 7/483; H02M 7/4835; H02M 7/53871; H02M 1/0085; H02M 1/0095
See application file for complete search history.

(56) References Cited

U.S. PATENT DOCUMENTS 8,867,244 B2 * 10/2014 Trainer ................. H02J 3/1857
                                                        363/65
2017/0005590 A1 * 1/2017 Hasegawa ............. H02M 7/487
(Continued)

FOREIGN PATENT DOCUMENTS

GB        2 541 410        2/2017 ............. H02M 7/49

OTHER PUBLICATIONS

Search Report for International Application No. PCT/EP2018/097093, 14 pages, dated Mar. 18, 2019.
(Continued)

*Primary Examiner* — Gary L Laxton
(74) *Attorney, Agent, or Firm* — Slayden Grubert Beard PLLC

(57) ABSTRACT

Various embodiments include a modular multilevel converter comprising: two phase units in parallel each with an upper arm and a lower arm, each arm with cells in series, each cell with an energy storage element and switching the element in or out of the series of cells; a control unit for the switches; a middle converter arm in series between the upper and lower arm, with cells arranged in series; an upper node between the upper and middle arms and a lower node between the lower and middle arms; an upper bridging element arranged between said upper node and an AC terminal; and a lower bridging element arranged between said lower node and said AC terminal.

14 Claims, 7 Drawing Sheets

(56) References Cited

U.S. PATENT DOCUMENTS

2018/0183231 A1* 6/2018 Xie .................. H03K 17/08146
2018/0212533 A1* 7/2018 Nami .................... H02M 7/483
2018/0241321 A1 8/2018 Whitehouse .......... H02M 7/797

OTHER PUBLICATIONS

Search Report for EP Application No. 18154369.2, 10 pages, dated Jul. 18, 2019.
Wang Kui et al: "A new transformerless cascaded multilevel converter topology", Energy Conversion Congress and Exposition, 2009. ECCE. IEEE, IEEE, Piscataway, NJ, USA, pp. 3124-3129, XP031887949, DOI: 10.1109/ECCE.2009.5316470; ISBN: 978-1-4244-2893-9 * pp. 3124-3125; figures 2,6.
Du Sixing et al: "An Active Cross-Connected Modular Multilevel Converter (AC-MMC) for a Medium-Voltage Motor Drive", IEEE Transactions on Industrial Electronics, IEEE Service Center, Piscataway, NJ, USA, vol. 63, No. 8, pp. 4707-4717, XP011616265, ISSN: 0278-0046, DOI: 10.1109/TIE.2016.2547875 [gefunden am Jul. 8, 2016] Figure 1-2.

* cited by examiner

MODULAR MULTILEVEL CONVERTER

CROSS-REFERENCE TO RELATED APPLICATIONS

This application is a U.S. National Stage Application of International Application No. PCT/EP2018/097093 filed Dec. 28, 2018, which designates the United States of America, and claims priority to EP Application No. 18154369.5 filed Jan. 31, 2018, the contents of which are hereby incorporated by reference in their entirety.

TECHNICAL FIELD

The present disclosure relates to converters. Various embodiments include modular multilevel converters and/or methods of operation for the modular multilevel converter.

BACKGROUND

Modular multilevel converters (MMC) are a comparatively recent and attractive solution for power conversion without transformers. Some of their advantages are a high scalability, lesser or no need for AC filters and lesser or no need for DC link capacitors at the DC bus. A disadvantage of MMC is their high complexity which comes from the high number of individual converter cells and the associated switch control and capacitor charge balancing.

SUMMARY

The teachings of the present disclosure describe improved modular multilevel converters with decreased complexity. For example, some embodiments of the present disclosure include a modular multilevel converter (300, 400) for converting between a DC voltage and an AC voltage, the modular multilevel converter (300, 400) comprising: at least two phase units (102, 202) connected in parallel and connectable to a DC terminal, the phase units (102, 202) each comprising an upper converter arm (108) and a lower converter arm (112), each converter arm (108, 112) having one or more cells (C, CF, CH) being arranged in series, wherein each cell (C, CF, CH) comprises an energy storage element (CP) and a switching arrangement adapted to switching the energy storage element (CP) in or out of the series of cells (C, CF, CH), a control unit being adapted to control the switching arrangements of the cells (C, CF, CH), a middle converter arm (110) arranged in series between the upper and lower converter arm (108, 112), the middle converter arm (110) having one or more cells (C, CF, CH) being arranged in series, an upper node (116) between said upper and middle converter (108, 110) arm and a lower node (122) between said lower and middle converter arm (112, 110), an upper bridging element (118) arranged between said upper node (116) and an AC terminal (120), and a lower bridging element (124) arranged between said lower node (122) and said AC terminal (120).

In some embodiments, each of the bridging elements (118, 124) has a voltage rating equal to or higher than that of the middle converter arm (110).

In some embodiments, the energy storage elements (CP) are capacitors (CP) and the capacitors (CP) in the middle converter arm (110) have a smaller capacity than the capacitors (CP) of the lower or upper converter arm (108, 112).

In some embodiments, the voltage rating of the middle, upper and lower converter arm (108, 110, 112) are equal.

In some embodiments, the voltage rating of the middle converter arm (110) is lower than the voltage rating of the upper and/or lower converter arm (108, 112).

In some embodiments, the bridging elements (118, 124) each comprise one or more switches (802) that are optimized for low conduction losses.

In some embodiments, the bridging elements (118, 124) each comprise one or more thyristors with reverse diodes.

In some embodiments, the cells (C, CF, CH) of the upper and lower converter arm (108, 112) are full-bridge type cells (CF) and the cells of the middle converter arm (110) are half-bridge type cells (CH).

In some embodiments, there are three or more of said phase units (102, 202) being arranged in parallel.

In some embodiments, there are a second upper bridging element (218) arranged between said upper node (116) and an AC terminal (120), and a second lower bridging element (224) arranged between said lower node (122) and said AC terminal (120).

In some embodiments, there is a first disconnector (206) between the middle point (204) of the upper and lower bridging element (118, 124) and the AC terminal (120) and a second disconnector (210) between the middle point (208) of the second upper and lower bridging element (218, 224) and the AC terminal (120).

As another example, some embodiments include a method for operating the modular multilevel converter (300, 400) as described herein, wherein the phase units (102, 202) are connected to a DC network and the AC terminals (120) of the phase units are connected to an AC network, the control unit controls the switching arrangements of the cells (C, CF, CH) of the upper and lower converter arm (108, 112) to adapt the voltage of the upper and lower converter arm (108, 112) to the AC voltage level and the control unit controls the bridging elements (118, 124) by turning on the upper bridging element (118) when the lower converter arm (112) voltage is higher than the upper converter arm (108) voltage, and turning on the lower bridging element (124) when the lower converter arm (112) voltage is lower than the upper converter arm (108) voltage.

In some embodiments, the control unit switches the bridging elements (118, 124) with a frequency that is twice the AC voltage frequency.

In some embodiments, the control unit controls the switching arrangements of the cells (C, CF, CH) of the middle converter arm (110) such that the individual switches (H1a, H1b, H2a, H2b) are turned on and/or off when their voltage is zero.

BRIEF DESCRIPTION OF THE DRAWINGS

Embodiments of the teachings of the present disclosure are described with reference to the accompanying drawings to which the scope of the disclosure is not limited. The illustrations of the drawings are in schematic form. It is noted that in different figures, similar or identical elements use the same reference signs. In the figures.

DETAILED DESCRIPTION

Figure 1:
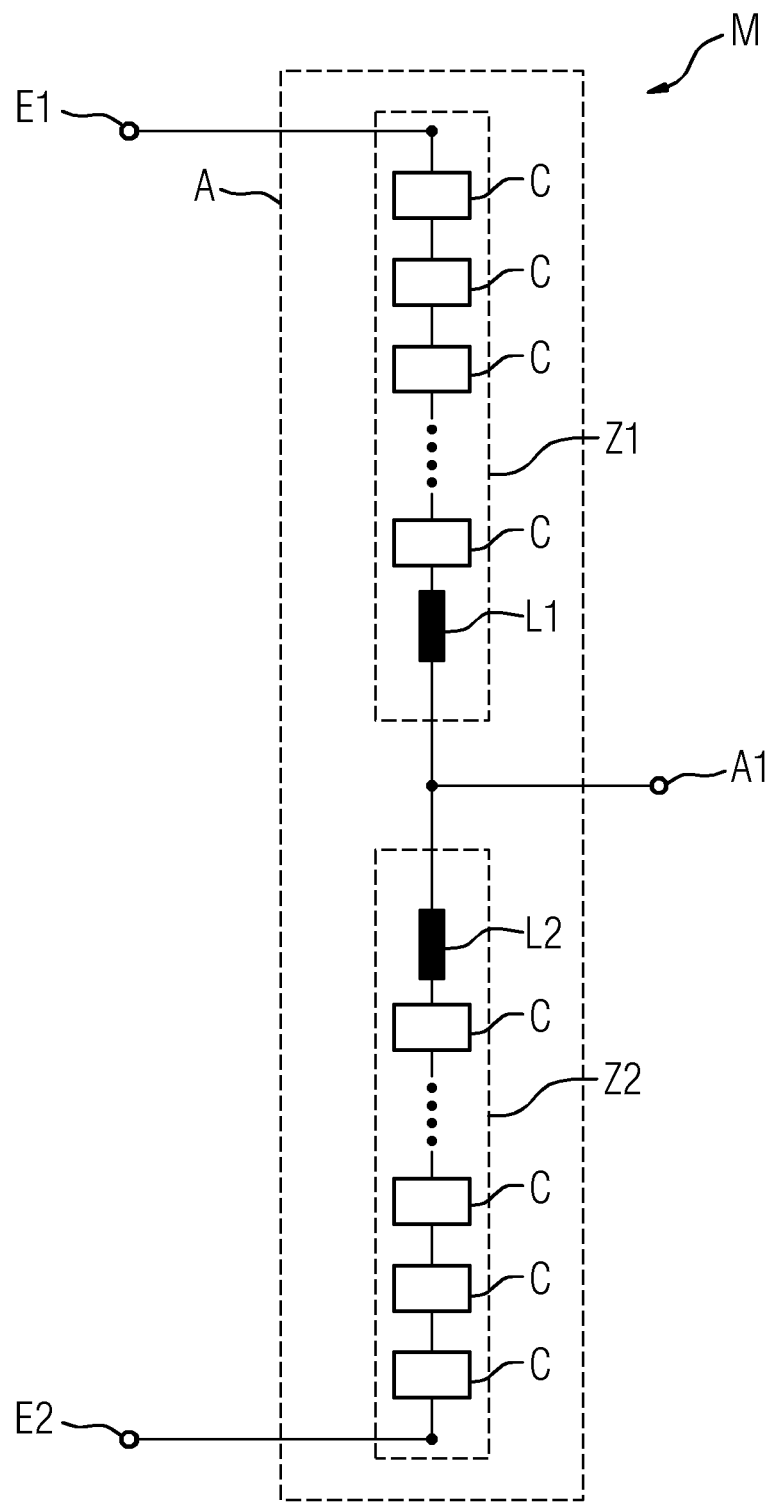
FIG. 1 illustrates a modular multilevel converter according to the prior art.

In some embodiments, a modular multilevel converter for converting between a DC voltage and an AC voltage comprises at least two phase units connected in parallel and connectable to a DC terminal, the phase units each comprising an upper converter arm and a lower converter arm, each converter arm having one or more cells being arranged in series, wherein each cell comprises an energy storage element and a switching arrangement adapted to switching the energy storage element in or out of the series of cells. In addition, the modular multilevel converter comprises a control unit adapted to control the switching arrangements of the cells.

In some embodiments, the modular multilevel converter comprises a middle converter arm arranged in series between the upper and lower converter arm, the middle converter arm having a one or more cells being arranged in series, an upper node between said upper and middle converter arm and a lower node between said lower and middle converter arm, an upper bridging element arranged between said upper node and an AC terminal and a lower bridging current control arranged between said lower node and said AC terminal. The middle converter arm can be used to either support the lower converter arm or the upper converter arm, depending on the AC voltage. In that way the number of cells required for a given DC link voltage can be reduced by 25%.

There is an additional benefit from the capacitor size. The middle converter arm supports both the upper and lower converter arm and the resulting current ripple has twice the frequency of the current ripple in the upper and lower converter arm. Because of the increased frequency the cell capacitors of the middle converter arm can be reduced in size without affecting the ripple current.

Further features that may be added alone or together in exemplary embodiments of the teachings herein include:

The controlling means may take the form of a microcontroller such as an FPGA. It may be adapted to control said upper and lower bridging elements.

The voltage rating of each of the bridging elements may have a voltage rating equal to or higher than that of the middle converter arm.

The capacitors of the cells in the middle converter arm may have a smaller capacity than the capacitors of the lower or upper converter arm. In a further embodiment the capacitors of the cells in the middle converter arm may have half the capacity of the capacitors of the lower or upper converter arm. A smaller capacity leads to a smaller size of the cells of the middle converter arm.

The voltage rating of the middle, upper and lower converter arm may be equal.

In some embodiments, the voltage rating of the middle converter arm may be lower than the voltage rating of the upper and/or lower converter arm.

The bridging elements each comprise one or more switches that are optimized for low conduction losses. In a further embodiment the switches may be IGCTs (Integrated gate-commutated thyristors). This will advantageously reduce overall losses as the bridging elements have to switch only at a relatively low frequency of the order of the supply network frequency (50 Hz or 60 Hz). The bridging elements may switch at double the network frequency.

The bridging elements may each comprise one or more diodes. Especially when the modular multilevel converter is used as a rectifier, using diodes makes the modular multilevel converter cheaper and simpler in setup and operation.

The bridging elements may comprise one or more thyristors with reverse diodes as these have low conduction losses.

One or more of the upper, lower, and middle converter arms may comprise a plurality of cells.

In some embodiments, the cells of the upper and lower converter arm are full-bridge type cells while the cells of the middle converter arm are half-bridge type cells. This can allow DC fault blocking by controlling the phase-to-phase voltage between the cells with the full-bridges to control current from the AC side to the DC side.

The modular multilevel converter may comprise three or more of said phase units arranged in parallel. This allows 3-phase operation of the modular multilevel converter.

The modular multilevel converter may comprise a second upper bridging element arranged between said upper node and an AC terminal and a second lower bridging current control arranged between said lower node and said AC terminal. These second bridging elements allow bypassing the bridging elements and therefore enhance the reliability of the modular multilevel converter. In addition, the parallel second bridging elements reduce conduction losses by half.

The modular multilevel converter may further comprise a first bridge switch between the middle point of the upper and lower bridging element and the AC terminal and a second bridge switch between the middle point of the second upper and lower bridging element and the AC terminal. These bridge switches allow disconnecting the bridging element and the second bridging element, respectively. Thus, a short circuit in either upper or lower bridging element can be controlled by disconnecting that particular bridging element. This enhances the reliability of the modular multilevel converter. Achieving the same reliability without the bridge switches would require additional switches in series, creating higher losses.

As another example, some embodiments include a method for operating the modular multilevel converter, wherein the phase units are connected to a DC network and the AC terminals of the phase units are connected to an AC network, the control unit controls the switching arrangements of the cells of the upper and lower converter arm to adapt the voltage of the upper and lower converter arm to the AC voltage level and the control unit controls the bridging elements by turning on the upper bridging element when the lower converter arm voltage is higher than the upper converter arm voltage, and turning on the lower bridging element when the lower converter arm voltage is lower than the upper converter arm voltage.

In some embodiments, the other of the upper and lower bridging elements is turned off.

In some embodiments, said networks may be loads or supply networks or any other sort of electrical network.

In some embodiments, the control unit switches the bridging elements with a frequency that is twice the AC voltage frequency.

The control unit may control the switching arrangements of the cells of the middle converter arm such that the individual switches are turned on and/or off when their voltage is zero thus reducing switching losses.

FIG. 1 illustrates a basic setup of a modular multilevel converter M for converting a DC voltage into an AC voltage or vice versa according to the prior art. FIG. 1 shows a single-phase unit A of the modular multilevel converter M.

The phase unit A is connected to a DC line with DC terminals E1, E2 and has an AC terminal A1. The number of phase units A used in actual embodiments of such a modular multilevel converter M can be one, two, three, or more. If the modular multilevel converter M comprises a plurality of phase units A these are typically arranged in parallel, i.e. the phase units A are each connected to the same DC line while their individual AC terminals A1 form the AC phase terminals. Each phase unit A comprises an upper converter arm Z1 and a lower converter arm Z2, each converter arm Z1, Z2 having a plurality of two-terminal cells C being arranged in series.

In addition, each converter arm Z1, Z2 comprises an inductive element in the form of coils LI, L2 in series with the series of cells C. The converter arms Z1, Z2 in turn are connected in series between the DC terminals El, E2. In its most basic form the cells C comprise an energy storage element and a switching arrangement. The energy storage element is usually a capacitor. The switching arrangement enables the cell C to either short-circuit its two terminals, bypassing the energy storage, or place the energy storage element between its two terminals.

The modular multilevel converter M further comprises a control unit adapted to control the cells C of the phase units A to convert between the DC terminals El, E2 and the AC terminals A1. To do this each cell C is adapted to generate a voltage step by charging its energy storage with the respective input voltage or from outside sources. The control unit is adapted to switch on part of the cells of one phase unit and to bypass the remainder of the cells of a phase unit A such that the sum of the voltage of the activated cells in the phase unit is equal to the direct current voltage. The ratio of activated cells C between the upper and lower converter arm Z1, Z2, sets the voltage at the AC terminal A1 of the phase unit. Varying the ratio in a sinusoidal manner may create a relatively smooth AC voltage at AC terminal A1.

Figure 2:
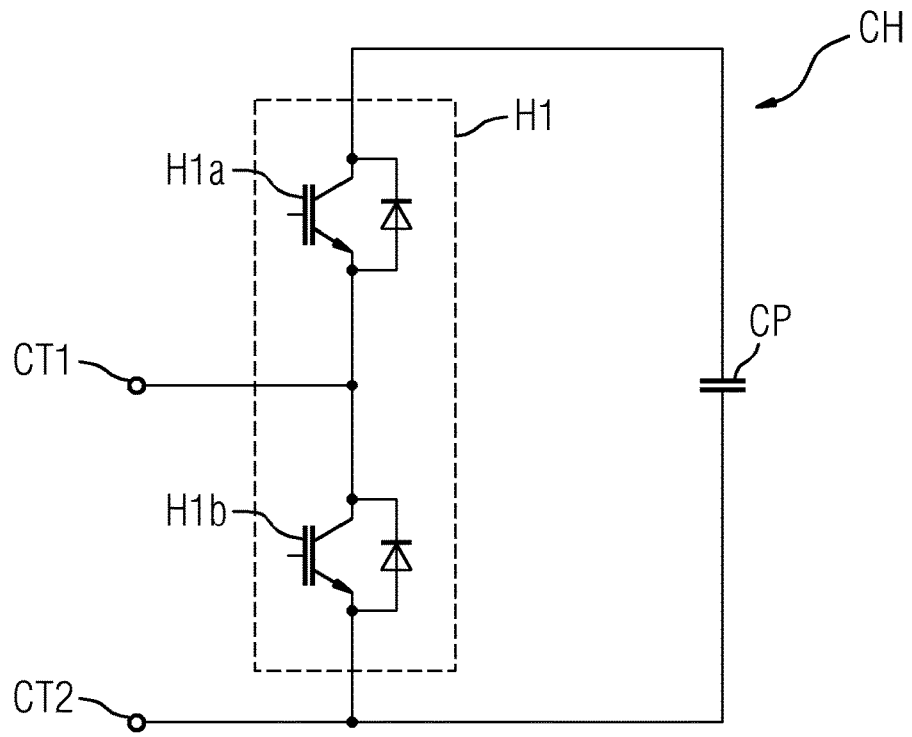
FIGS. 2 and 3 illustrate examples of converter cells incorporating teachings of the present disclosure.

FIG. 2 shows an exemplary cell CH incorporating teachings of the present disclosure. Cell CH is a half-bridge cell. It comprises a half-bridge HI of two serially connected switches H1a, H1b. The switches H1a, H1b may be IGBTs or other kinds of semiconductor switches. A capacitor CP is arranged in parallel to the half-bridge HI. A first terminal CT1 of the half-bridge cell CH is formed by the node between the switches H1a, H1b of the half-bridge HI. A second terminal CT2 of the half-bridge cell CH is formed by one of the outer nodes of the half-bridge HI, in FIG. 2 by the lower node of switch H1a. The half-bridge cell CH is the simplest form of a cell C for a modular multilevel converter M and it is able to bypass the capacitor CP by activating switch H1a and it is able to place capacitor CP in a single polarity between its terminals CT1, CT2 by turning off switch H1a and turning on switch H1b.

Figure 3:
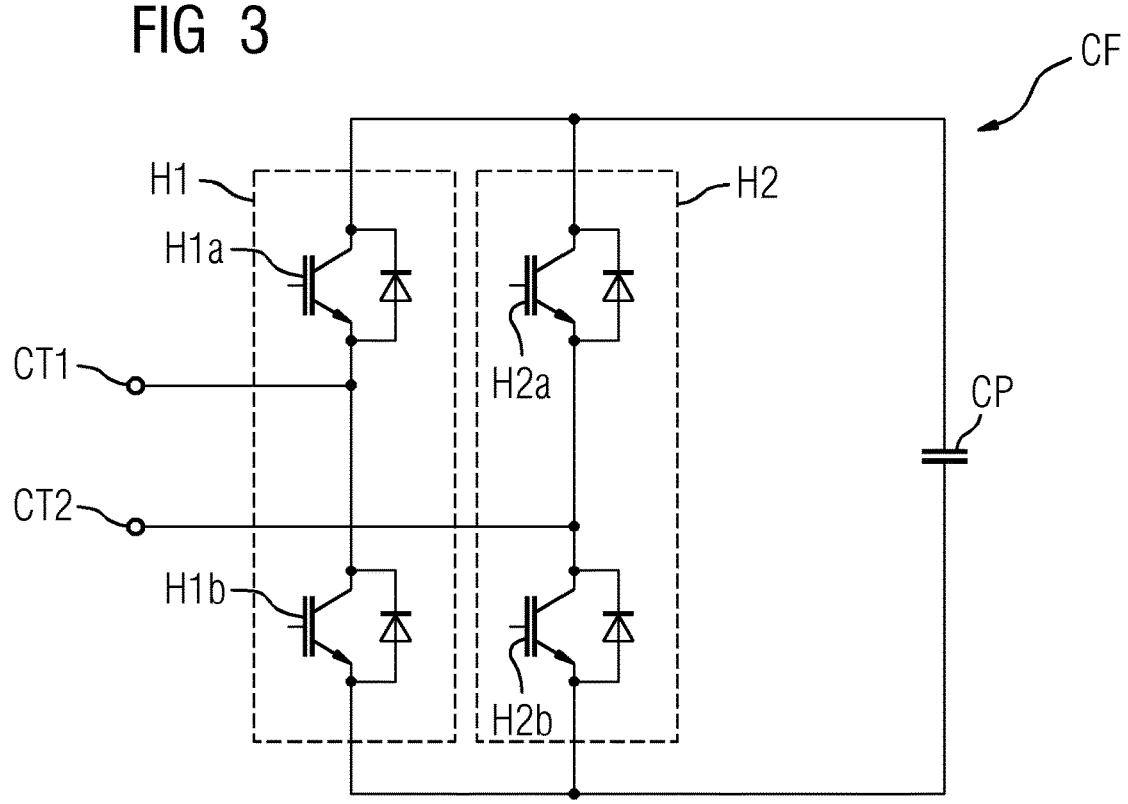

FIG. 3 shows an exemplary cell CF incorporating teachings of the present disclosure. Cell CF is a full-bridge cell. It comprises two half-bridges HI, H2 of two serially connected switches Hla, Hlb, H2a, H2b each. A capacitor CP is arranged in parallel to the half-bridges HI, H2. As with the half-bridge cell CH, a first terminal CT1 of the full-bridge cell CF is formed by the node between the switches H1a, H1b of the half-bridge HI. Contrary to the half-bridge cell CH, the second terminal CT2 of the full-bridge cell CF is formed by the node between the switches H2a, H2b of the second half-bridge H2. The full-bridge cell CF is able to bypass the capacitor CP by activating one switch of each of the half bridges HI, H2. Additionally, it is able to place capacitor CP between its terminals CT1, CT2 in both polarities. It is thus a cell C with extended capability but also an increased number of switches.

Figure 4:
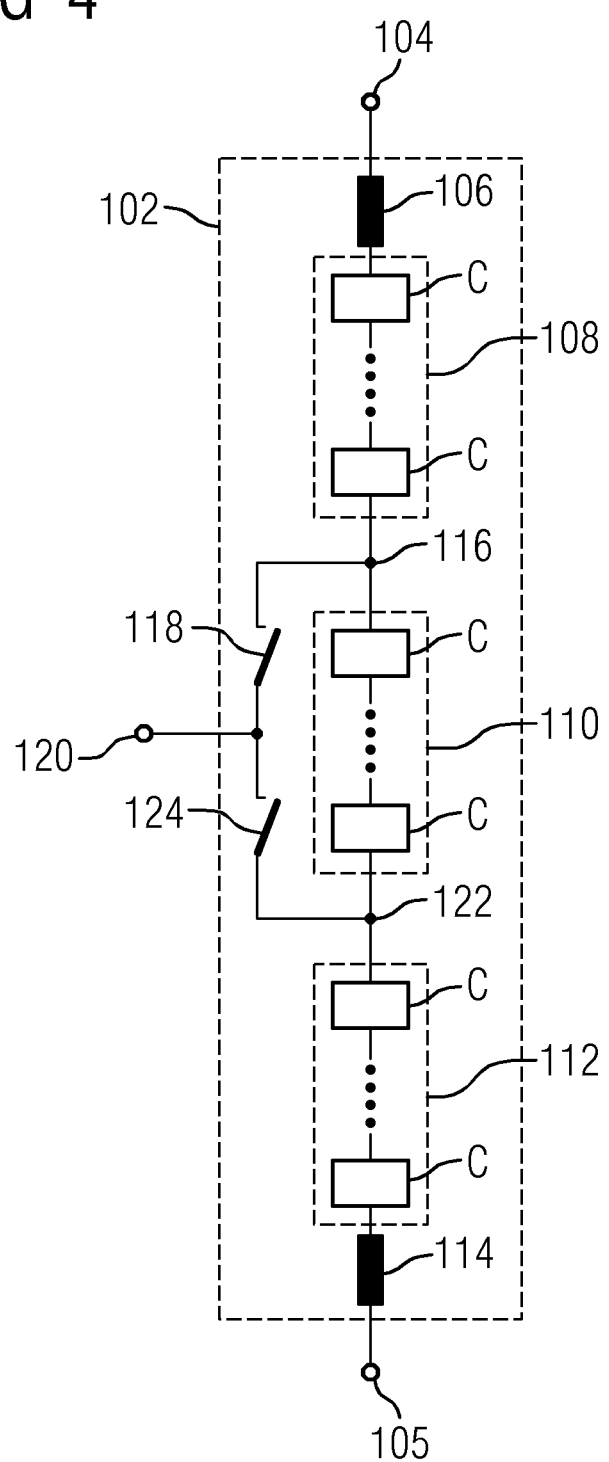
FIG. 4 illustrates a phase unit of a modular multilevel converter incorporating teachings of the present disclosure.

FIG. 4 shows a phase unit 102 of a modular multilevel converter 100 incorporating teachings of the present disclosure. The phase unit 102 comprises a first and second DC terminal 104, 105 for connection to a DC voltage such as a DC link. Arranged between the DC terminals 104, 105 is a series comprising a first inductivity 106, an upper converter arm 108, a middle converter arm 110, a lower converter arm 112 and a second inductivity 114. The node 116 between the upper converter arm 108 and the middle converter arm 110 is connected to an upper bridging element 118 and past the upper bridging element 118 to an AC terminal 120. The node 122 between the lower converter arm 112 and the middle converter arm 110 is connected to a lower bridging element 124 and past the lower bridging element 124 to the AC terminal 120.

As with the modular multilevel converter M of FIG. 1, the upper and lower converter arm 108, 112 each comprise at least one cell C, but typically a series of cells C that may be of any cell type such as the half-bridge cell CH or the full-bridge cell CF. The upper and lower converter arm 108, 112 may also contain parallel connections of cells C. The middle converter arm 110 also comprises at least one cell C, but typically a series of cells C that may be of any cell type such as the half-bridge cell CH or the full-bridge cell CF. The number of cells C or the middle converter arm 110 is typically equal to the number of cells C in each of the upper and lower converter arm 108, 112 but there are embodiments in which the number of cells C of the middle converter arm 110 is smaller than the number of cells C in each of the upper and lower converter arm 108, 112.

The voltage rating of the converter arms 108, 110, 112 is tied to the number of cells C present in each converter arm 108, 110, 112 and the voltage rating of the switches H1a, H1b, H2a, H2b in the cells C. While in a modular multilevel converter M of FIG. 1 the voltage rating of the upper and lower converter arm Z1, Z2 should each be at least equal to the expected DC voltage value, the voltage rating of the converter arms 108, 110, 112 of the modular multilevel converter of FIG. 4 may be different. In some embodiments, the voltage rating of each of the converter arms 108, 110, 112 is equal to half the DC voltage value. If redundancy is required, the voltage rating of some or all of the converter arms may be increased above this value.

In some embodiments, the voltage rating of the converter arms 108, 110, 112 may be assigned differently. For example, the voltage rating of each of the upper and lower converter arms 108, 112 may be equal to ⅔ of the DC voltage while the voltage rating of the middle converter arm must then be ⅓ of the DC voltage. In some embodiments, some or all voltage rating values can be increased above the required value for redundancy. In some embodiments, the sum of the voltage ratings of the upper and middle converter arms 108, 110 and the sum of the voltage ratings of the lower and middle converter arms 108, 110 is at least equal to the DC voltage. In some embodiments, the voltage rating of each of the upper and lower converter arm 108, 112 must be at least half the DC voltage.

It may be seen that when the voltage rating of each of the converter arms 108, 110, 112 is equal to half the DC voltage value, the total voltage rating of all cells C combined is equal to 1.5 times the DC voltage. In a modular multilevel converter M according to the prior art with a voltage rating of the DC voltage for the upper and lower converter arm Z1, Z2 the number of cells C is twice the DC voltage. Thus, the phase unit 102 of FIG. 4 requires only 75% of the cells of a comparable phase unit of a standard modular multilevel converter. This reduces the number of capacitors necessary and therefore the size and weight of the modular multilevel converter 100.

In some embodiments, the voltage rating of the bridging elements 118, 124 is at least equal to the voltage rating of the middle converter arm 110. The control unit of the modular multilevel converter 100 controls the cells C as well as the bridging elements 118, 124 to adjust to the DC and AC voltages at the terminals 104, 105, 120. In the case of a DC to AC voltage conversion, this means the required number of cells C is each switched to an active state where the capacitor CP is not bypassed to generate the required instant value of the AC voltage. Since the upper or lower converter arm 108, 112 alone cannot block the whole DC voltage, any instant AC voltage with an absolute above the voltage rating of the upper or lower converter arm 108, 112 is generated by adding the middle converter arm 110 to either the upper or lower converter arm 108, 112, depending on where the voltage must be blocked. Adding the middle converter arm 110 to the lower converter arm 112 is done by switching on the upper bridging element 118 and switching off the lower bridging element 124.

Adding the middle converter arm 110 to the upper converter arm 108 is done by switching off the upper bridging element 118 and switching on the lower bridging element 124. It may be seen that the state of the bridging elements 118, 124 needs to change only at some point between the peak values of the instant AC voltage value, for example when the AC value has a zero-crossing. Thus, the state of the bridging elements 118, 124 needs to change only twice per full wave of the AC frequency, i.e. at double the AC voltage frequency. This frequency may e.g. be 100 Hz or 120 Hz and is low compared to the frequency at which the states of cells C changes. Therefore, the bridging elements 118, 124 can be constructed using switches optimized for low conduction losses. For example, bridging elements 118, 124 can e.g. be constructed using IGCTs.

When the control unit has set the state of the bridging elements 118, 124 so that the middle converter arm 110 is added to the lower converter arm 112, the control unit may treat the cells C of the lower and middle converter arms 110, 112 as if they were part of a single converter arm. The sum of the voltage ratings of the lower and middle converter arms 110, 112 is at least equal to the DC voltage, thus activating the cells C of the combined converter arms 110, 112 to set the AC voltage value may be done in a known way for modular multilevel converters. The same is true for the combined middle and upper converter arm 108, 110, when the control unit has set the state of the bridging elements 118, 124 so that the middle converter arm 110 is added to the upper converter arm 108, which is the case when the instant AC voltage value is closer to the lower DC voltage value at the second DC terminal 105.

When the absolute value of the AC voltage is below the value that can be supported by the lower or upper converter arm 108, 112 alone then the middle converter arm 110 need not be added to either of the other converter arms 108, 112. Instead the control unit may bypass the middle converter arm 110 by switching on both bridging elements 118, 124. In some embodiments, the middle converter arm 110 could then be used to aid in the charge balancing of capacitors in either the upper or lower converter arm 108, 112.

Figure 5:
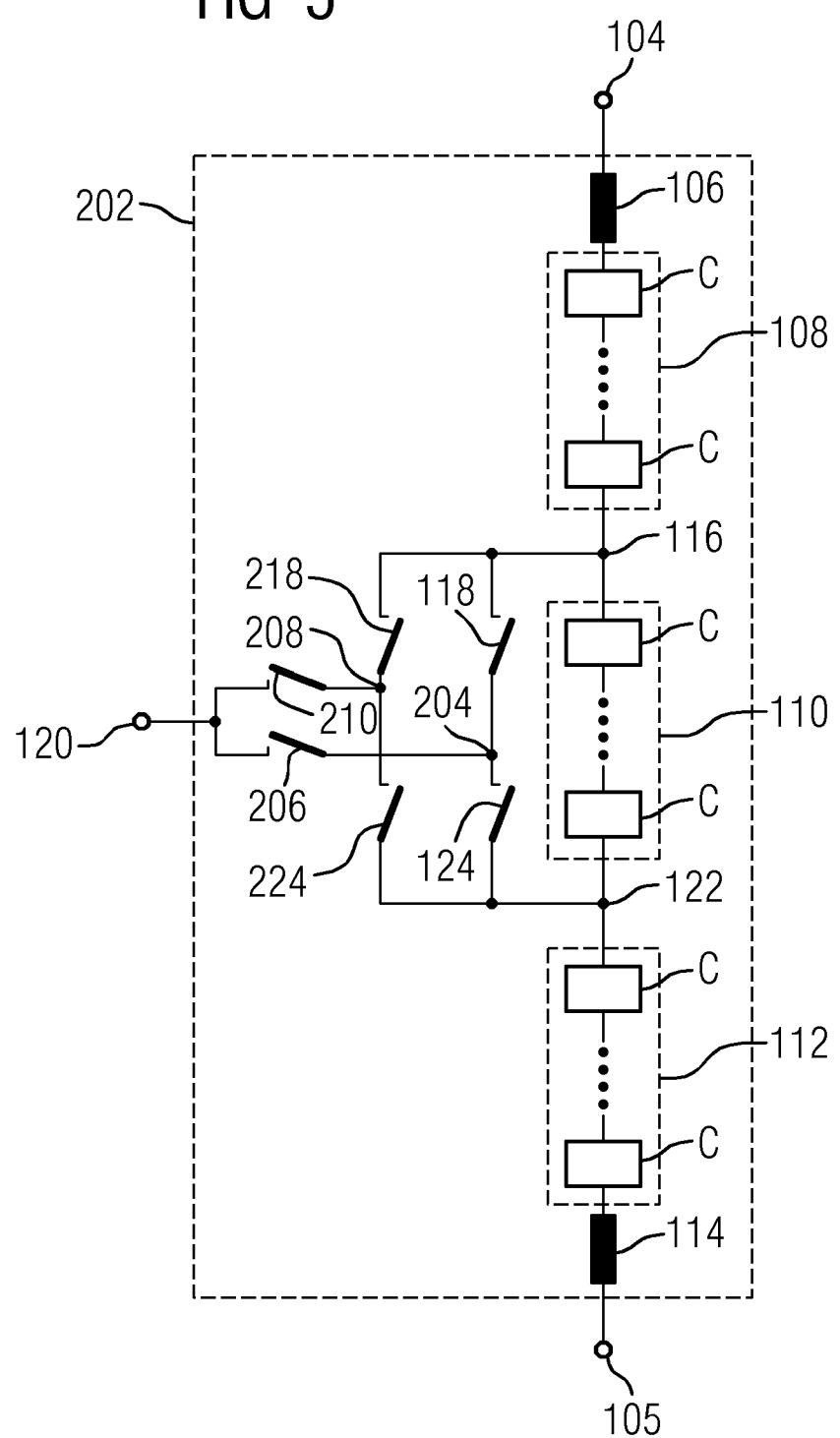
FIG. 5 illustrates a second phase unit of a modular multilevel converter incorporating teachings of the present disclosure.

FIG. 5 shows a second exemplary embodiment of a phase unit 202 of a modular multilevel converter 100 incorporating teachings of the present disclosure. Phase unit 202 comprises the elements of the phase unit 102 of FIG. 4 as well as additional elements.

The upper and lower bridging elements 118, 124 are connected at node 204. In the phase unit 202 of FIG. 5 node 204 is connected to the AC terminal 120 not directly but across a dis connecting switch 206. In addition, phase unit 202 comprises a second upper bridging element 218 and a second lower bridging element 224. The second bridging elements 218, 224 are arranged similarly to the bridging elements 118, 124, i.e. the node 116 between the upper and the middle converter arm 108, 110 is connected to the second upper bridging element 218. The node 122 between the lower and the middle converter arm 110, 112 is connected to the second lower bridging element 224. The other terminals of the second bridging elements 218, 224 are connected at node 208. Node 208 is connected to the AC terminal 120 through a disconnecting switch 210.

Phase unit 202 thus adds a secondary current path through the bridging elements 118, 124, 218, 224. This secondary current path reduces the conduction losses that occur under normal circumstances. During normal operation, disconnecting switches 206, 210 are typically left in a closed state, e.g. conductive. In some embodiments, the secondary current path reduces the chance of failure of the phase unit 202. The cells C of modular multilevel converters are usually built so that a single failure of a switch will only render the individual cell C nonfunctional, leaving the modular multilevel converter with only a small reduction of capability. If the modular multilevel converter is built with redundant cells C, i.e. with more cells C than necessary for normal operation, a single failure will not change its capabilities at all.

In the phase unit 102 of FIG. 4 however a failure of a bridging element 118, 124 may leave the phase unit 102 with a heavy reduction of capability or non-functional. A failure of a bridging element 118, 124, 218, 224 in phase unit 202 of FIG. 5 however will not leave phase unit 202 nonfunctional. If a failure of a bridging element 118, 124, 218, 224 leaves the bridging element 118, 124, 218, 224 nonconductive, the respective parallel bridging element 118, 124, 218, 224 may take the full current to the respective node 116, 122. In this case only the conduction losses are increased but the function of phase unit 202 is unchanged. If the failure leaves bridging element 118, 124, 218, 224 short-circuited, the respective disconnecting switch 206, 210 may be opened to disconnect the particular bridging element 118, 124, 218, 224. This disconnects both the respective upper and lower bridging element 118, 124, 218, 224 which again increases conduction losses but leaves phase unit 202 otherwise fully functional.

Figure 6:
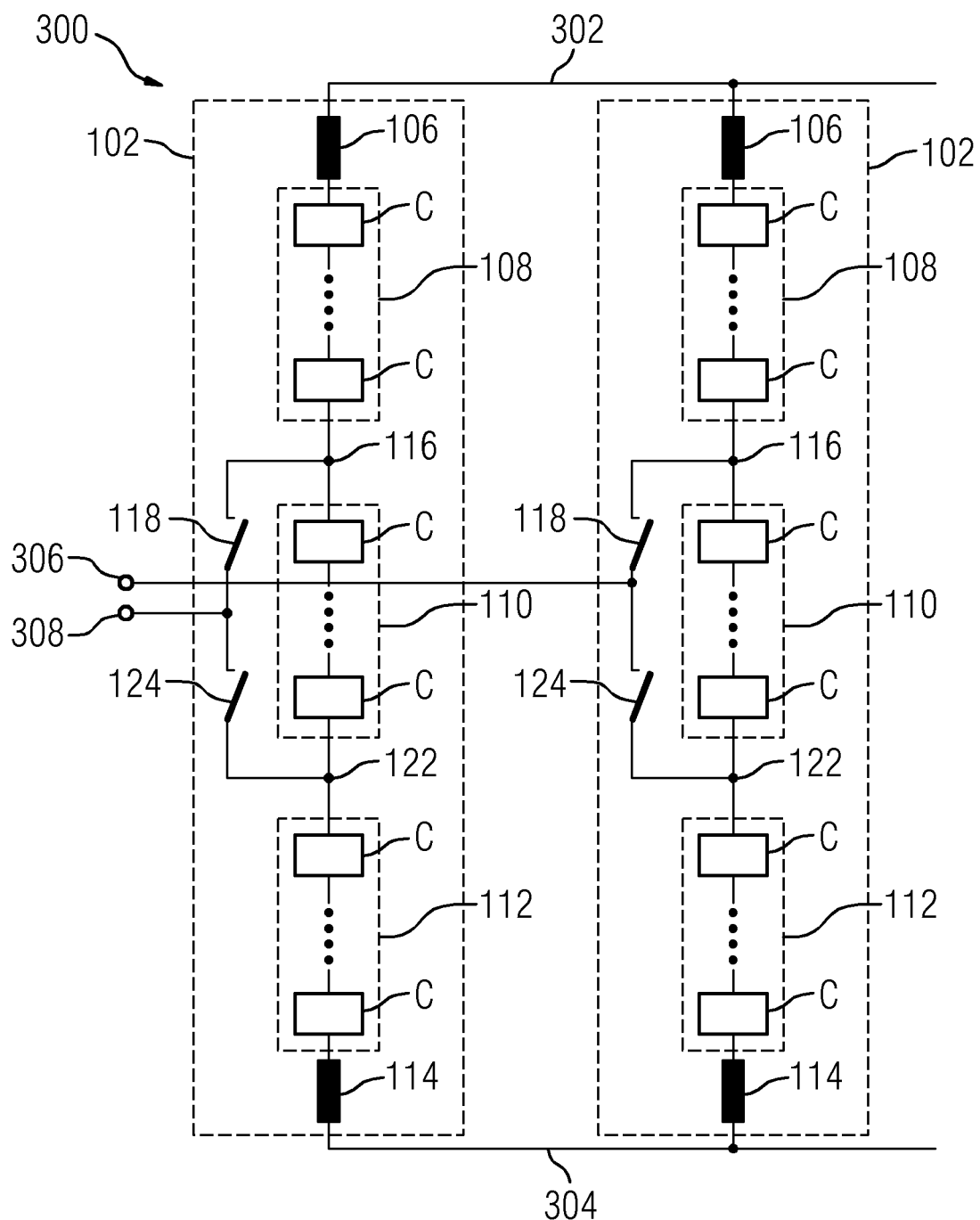
FIG. 6 illustrates a single phase modular multilevel converter incorporating teachings of the present disclosure.

FIG. 6 shows a single phase modular multilevel converter 300 built from phase units 102 of FIG. 4. The single phase modular multilevel converter 300 uses two such phase units 102 in parallel arrangement. The phase units 102 are connected to DC link lines 302, 304 and the AC terminals 120 of the phase units form AC terminals 306, 308 of the single phase modular multilevel converter 300. Alternatively to using the phase units 102 of FIG. 4, phase units 202 of FIG. 5 could be used in the single phase modular multilevel converter 300.

Figure 7:
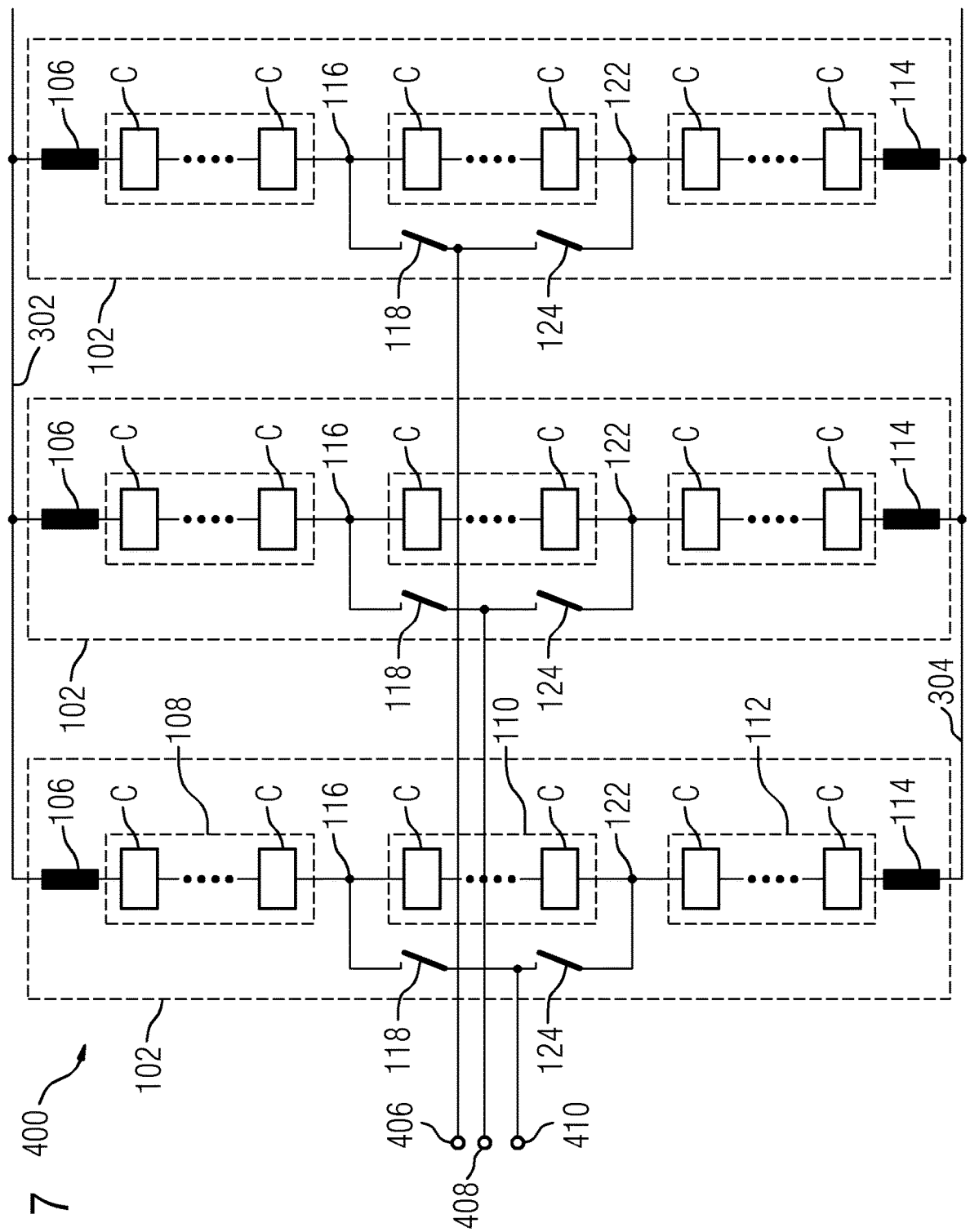
FIG. 7 illustrates a three phase modular multilevel converter incorporating teachings of the present disclosure.

FIG. 7 shows a three-phase modular multilevel converter 400, again built from phase units 102 of FIG. 4. The three-phase modular multilevel converter 400 uses three phase units 102 in parallel arrangement. The phase units 102 are connected to DC link lines 302, 304 and the AC terminals 120 of the phase units form AC terminals 406, 408, 410 of the three-phase modular multilevel converter 400. Alternatively to using the phase units 102 of FIG. 4, phase units 202 of FIG. 5 could be used in the three-phase modular multilevel converter 400.

Specific embodiments of the single phase modular multilevel converter 300 or the three-phase modular multilevel converter 400 may use an inductive element LI, L2 on the outside, i.e. close to the DC terminals 104, 105 as shown in FIGS. 4 to 7. In some embodiments, the inductive elements LI, L2 could be arranged differently, such as close to the AC terminals 120 or as smaller inductive elements within the cells C or between the cells C. Some embodiments of the single phase modular multilevel converter 300 or the three-phase modular multilevel converter 400 may use the same type of cells C for all converter arms 108, 110, 112, e.g. half-bridge cells CH or full-bridge cells CF. In some embodiments, different types of cells C may be used. In some embodiments, the upper and lower converter arm 108, 112 use full-bridge cells CH capable of DC fault blocking by controlling the phase-to-phase voltage between the cells C with the full-bridge cells CF to control current from the AC side to the DC side. The middle converter arm 110 that is not necessary for DC fault blocking uses only half-bridge cells CH for simpler control and fewer switches.

Figure 8:
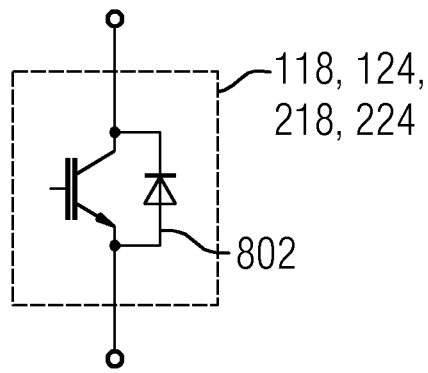
FIGS. 8-10 illustrate examples of bridging elements of the phase units of FIGS. 4 and 5 and of modular multilevel converters of FIGS. 6 and 7.
Figure 9:
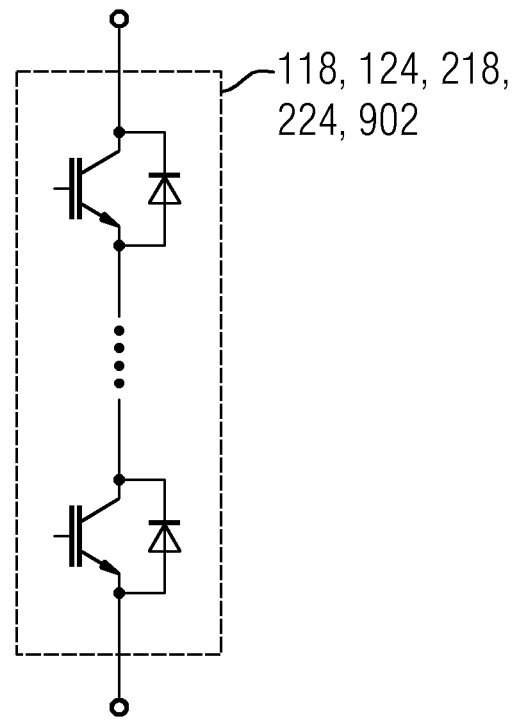
Figure 10:
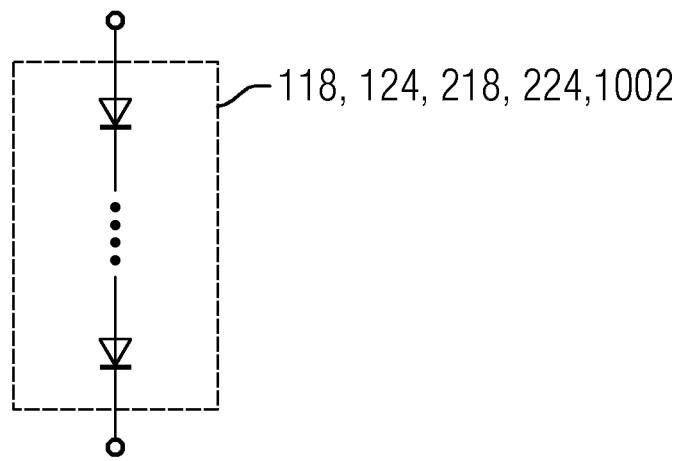

FIGS. 8 to 10 show different embodiments of the bridging elements 118, 124, 218, 224 incorporating teachings of the present disclosure. When the DC voltage is within the voltage rating of a single switch, e.g. when the DC voltage is 400 V, a single switch 802, e.g. an IGBT may be used as each of the bridging elements 118, 124, 218, 224 as shown in FIG. 8. In this case it may be that the phase units 102, 202 only use a single cell C in each of the converter arms 108, 110, 112.

When the DC voltage is outside the limits of a single device, a series 902 of switches such as IGBTs may be used as each of the bridging elements 118, 124, 218, 224 as shown FIG. 9.

FIG. 10 shows a third possibility where a series 1002 of diodes is used for each of the bridging elements 118, 124, 218, 224. A single diode or a series 1002 of diodes can be used when the modular multilevel converter is used as a rectifier, i.e. in AC to DC operation.

What is claimed is:

1. A modular multilevel converter for converting between a DC voltage and an AC voltage, the modular multilevel converter comprising:
    two phase units connected in parallel and connectable to a DC terminal, wherein the phase units each comprise an upper converter arm, a middle converter arm, and a lower converter arm, wherein each converter arm includes one or more cells arranged in series, wherein each cell comprises an energy storage element and a switching arrangement switching the energy storage element in or out of the series of cells;
    a control unit controlling the switching arrangements of the one or more cells;
    wherein the upper converter arm is in series with the middle converter arm with an upper node therebetween;
    wherein the lower converter arm is in series with the middle converter arm with a lower node therebetween;
    an upper bridging element directly connecting said upper node and an AC terminal; and
    a lower bridging element directly connecting said lower node and said AC terminal.

2. The modular multilevel converter of claim 1, wherein each of the bridging elements has a voltage rating equal to or higher than a voltage rating of the middle converter arm.

3. The modular multilevel converter of claim 1, wherein:
    the energy storage elements of all of the coverter arms comprise capacitors; and
    the capacitors in the middle converter arm have a smaller respective capacity than the capacitors of the lower converter arm and the upper converter arm.

4. The modular multilevel converter of claim 1, wherein the respective voltage rating of the middle, upper, and lower converter arms are equal to one another.

5. The modular multilevel converter of claim 1, wherein the voltage rating of the middle converter arm is lower than a respective voltage rating of at least one of the upper or lower converter arm.

6. The modular multilevel converter of claim 1, wherein the bridging elements each comprise one or more switches optimized for minimum conduction losses.

7. The modular multilevel converter of claim 1, wherein the bridging elements each comprise one or more thyristors with reverse diodes.

8. The modular multilevel converter of claim 1, wherein:
    the cells of the upper and lower converter arm comprise full-bridge type cells; and
    the cells of the middle converter arm comprise half-bridge type cells.

9. The modular multilevel converter of claim 1, further comprising three or more of said phase units arranged in parallel.

10. The modular multilevel converter of claim 1, further comprising:
    a second upper bridging element arranged between said upper node and the AC terminal;
    a second lower bridging element arranged between said lower node and said AC terminal.

11. The modular multilevel converter of claim 10, further comprising:
    a first disconnector between the middle point of the upper and lower bridging element and the AC terminal; and
    a second disconnector between the middle point of the second upper and lower bridging element and the AC terminal.

12. A method for operating a modular multilevel converter comprising two phase units connected in parallel and connectable to a DC terminal, wherein the phase units each comprise an upper converter arm, a middle converter arm, and a lower converter arm, wherein each converter arm includes one or more cells arranged in series, wherein each cell comprises an energy storage element and a switching arrangement switching the energy storage element in or out of the series of cells, a control unit controlling the switching arrangements of the one or more cells, a middle converter arm in series with the upper converter arm an upper node located therebetween, the middle converter arm in series with the lower converter arm within series, an upper node between said upper and middle converter arm and a lower node therebetween, an upper bridging element directly connecting said upper node and an AC terminal, and a lower bridging element directly connecting said lower node and said AC terminal, wherein the phase units are connected to a DC network and the AC terminals of the phase units are connected to an AC network, the method comprising:
- controlling the switching arrangements of the cells of the upper and lower converter arm with the control unit to adjust the voltage of the upper and lower converter arm to the AC voltage level;
- turning on the upper bridging element when the lower converter arm voltage is higher than the upper converter arm voltage; and
- turning on the lower bridging element when the lower converter arm voltage is lower than the upper converter arm voltage.

13. The method of claim 12, further comprising switching the bridging elements with the control unit with a frequency twice an AC voltage frequency.

14. The method of claim 12, further comprising controlling the switching arrangements of the cells of the middle converter arm so individual switches of the respective converter arms are turned on and/or off when their voltage is zero.

* * * * *